United States Patent
Vester et al.

(10) Patent No.: US 12,487,301 B2
(45) Date of Patent: Dec. 2, 2025

(54) WIRELESS LOCAL COIL ARRAY WITH LOW INTERMEDIATE FREQUENCY

(71) Applicant: Siemens Healthcare GmbH, Erlangen (DE)

(72) Inventors: Markus Vester, Nuremberg (DE); JianMin Wang, ShenZhen (CN)

(73) Assignee: Siemens Healthineers AG, Forchheim (DE)

( * ) Notice: Subject to any disclaimer, the term of this patent is extended or adjusted under 35 U.S.C. 154(b) by 206 days.

(21) Appl. No.: 18/226,552

(22) Filed: Jul. 26, 2023

(65) Prior Publication Data

US 2024/0036129 A1 Feb. 1, 2024

(30) Foreign Application Priority Data

Jul. 26, 2022 (EP) .................................... 22186996

(51) Int. Cl.
*G01R 33/36* (2006.01)

(52) U.S. Cl.
CPC ..... *G01R 33/3692* (2013.01); *G01R 33/3621* (2013.01)

(58) Field of Classification Search
CPC ............ G01R 33/3692; G01R 33/3621; G01R 33/3415; G01R 33/3635; G01R 33/3642
See application file for complete search history.

(56) References Cited

U.S. PATENT DOCUMENTS

| 2007/0176601 | A1 | 8/2007 | Adachi |
| 2008/0197849 | A1* | 8/2008 | Heid ................. G01R 33/56375 324/318 |
| 2014/0091791 | A1* | 4/2014 | Bulumulla ......... G01R 33/3692 324/309 |
| 2019/0377043 | A1* | 12/2019 | Popescu ............... G01R 33/341 |

* cited by examiner

*Primary Examiner* — G. M. A Hyder
(74) *Attorney, Agent, or Firm* — Lempia Summerfield Katz LLC (57) ABSTRACT

A local coil array for a magnetic resonance tomography unit includes a plurality of antenna coils for receiving magnetic resonance signals from a patient, a first frequency converter for converting the magnetic resonance signals to a first intermediate frequency, and a plurality of transmission coils for transmitting intermediate frequency signals by inductive coupling. The magnetic resonance tomography unit includes a field of view and a plurality of reception coils for inductively coupling to transmission coils of the local coil array. The plurality of reception coils is arranged next to the field of view such that the plurality of reception coils inductively couples with transmission coils of the local coil array arranged at a patient in the field of view.

16 Claims, 5 Drawing Sheets

WIRELESS LOCAL COIL ARRAY WITH LOW INTERMEDIATE FREQUENCY

This application claims the benefit of European Patent Application No. EP 22186996.9, filed on Jul. 26, 2022, which is hereby incorporated by reference in its entirety.

BACKGROUND

The present embodiments relate to a local coil array, a magnetic resonance tomography unit with a wireless transmission of energy and/or data between local coil array, and a magnetic resonance tomography unit.

Magnetic resonance tomography units are imaging devices that, for imaging an examination object, align nuclear spins of the examination object with a strong external magnetic field and excite the nuclear spins by a magnetic alternating field for precession about this alignment. The precession or return of the spins from this excited state into a state with lower energy in turn generates a magnetic alternating field, also referred to as a magnetic resonance signal, as a response, which is received via antennas.

With the aid of magnetic gradient fields, a spatial encoding, which subsequently makes it possible to assign the received signal to a volume element, is impressed on the signals. The received signal is then evaluated, and a three-dimensional imaging presentation of the examination object is provided. The presentation created specifies a spatial density distribution of the spins.

Since the magnetic resonance signals are very weak, it is usual to arrange receive antennas (e.g., local coils) as close as possible to the region to be examined. For transmission of the received signals and for supplying power to pre-amplifiers and signal processing in the local coils, cable connections to the magnetic resonance tomography unit are mostly used in such cases, which are susceptible to faults, complicated to handle, and dangerous for the patient through the sheath currents caused by the excitation pulses on the conductors, at least when corresponding blocking filters are to be omitted.

There have therefore long been efforts to provide the local coils with wireless transmission technology. In such cases, however, wireless transmission technology is susceptible to faults (e.g., through interferences), supplying power to the local coils by batteries may lead, with constant use, to interruptions for charging the batteries, and the radio waves used may disrupt the magnetic resonance recording.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a local coil array for a more secure and more reliable operation is provided.

The local coil array according to the present embodiments is intended for use with a magnetic resonance tomography unit. The local coil array is configured to receive a magnetic resonance signal from the body of a patient at a Larmor frequency of the magnetic resonance tomography unit, where the Larmor frequency is defined by the static B0 magnetic field of the magnetic resonance tomography unit and the spins to be detected. The local coil array includes a plurality of antenna coils for receiving magnetic resonance signals from a patient. The antenna coils may include one or a plurality of conductor loops. In one embodiment, the antenna coils are tuned to be resonant at the Larmor frequency at least in a reception phase for a maximum sensitivity. The resonance frequency may be tuned or detuned using capacities (e.g., capacitors) or inductances (e.g., inductors).

The local coil array includes a first frequency converter for converting the magnetic resonance signals to a first intermediate frequency (e.g., for each antenna coil, a frequency converter is provided). The frequency converter is configured to change the frequency of a magnetic resonance signal at the Larmor frequency, after an optional amplification by a low noise amplifier LNA, to an intermediate frequency different from and not interfering with the original magnetic resonance signal. The intermediate frequency may be higher than the Larmor frequency, but may be lower than the Larmor frequency. The intermediate frequency is at least higher than the bandwidth of the magnetic resonance signal. Frequency conversion may be provided, for example, in an analog way by mixing the antenna signal at Larmor frequency with a local oscillator frequency. Other options are, however, possible using, for example, a digital signal processing. It is also possible to use a plurality of different intermediate frequencies (e.g., a first intermediate frequency and a second intermediate frequency).

The local coil array provides a plurality of transmission coils for transmitting the intermediate frequency signals by inductive coupling to a reception coil of a magnetic resonance tomography unit.

In one embodiment, a transmission amplifier is provided in the signal path between frequency converter and transmission coil. As the intermediate frequency of the converted antenna signal is different from the Larmor frequency, a higher amplification may be applied to compensate the transmission loss between the transmission coil of the local coil array and the reception coil in the magnetic resonance unit. A typical amplification of the transmission amplifier may be higher than 10 dB, 20 dB, or 30 dB.

Inductive coupling and a broader bandwidth of the transmission may be achieved, for example, by a resonant antenna with an impedance mismatch between antenna and the signal source of the signal to be transmitted. Inductive coupling is provided if the distance between transmission coil and reception coil is less than, for example, a quarter of a free wavelength of an electromagnetic wave in air with the frequency of the signal to be transmitted.

The transmission coils may be separate from the antenna coils for the magnetic resonance signals, but it is also possible to use a double resonant coil loop both as antenna for the magnetic resonance reception and intermediate frequency transmission.

The number of transmission coils may be equal to the number of antenna coils for magnetic resonance signal reception, assigning each antenna coil to a transmission coil for transmitting a single signal of a single antenna coil.

It is also possible that the number of transmission coils is larger than the number of the antenna coils of the local coil array (e.g., for covering a larger area for transmission, thereby allowing uninterrupted transmission even in case of a moving local coil). This may also be achieved with a larger number of reception coils in a patient couch covering a larger area than the area covered by the transmission coils.

The local coil array may also include a switching device for selecting the antenna coils to be connected to the transmission coils in case that the number of antenna coils is larger than the number of transmission coils The plurality of transmission coils is arranged at the local coil. The transmission coils may, for example, be located at the backside of the cover of a knee coil, head coil, or breast coil. In one embodiment, the transmission coils and the reception coils are located such that the distance between both is minimized in use, but the system according to the present embodiments is also able to provide a wireless connection (e.g., through the patient).

The conversion to an intermediate frequency and a plurality of transmission coils allow analog transmitting of a plurality of MR signals.

The magnetic resonance tomography unit according to the present embodiments includes a plurality of reception coils for inductively coupling to transmission coils of a local coil array. The reception coils may have a similar geometry and may be made from similar materials as the transmission coils. The reception coils may, however, also be different (e.g., as the transmission coils may be flexible to increase the comfort of the patient, while the reception coils in the patient couch may be rigid as the reception coils in the patient couch are embedded in the patient couch). The plurality of reception coils is arranged next to a field of view such that the plurality of reception coils inductively couples with a plurality of transmission coils of a local coil array arranged at a patient on the patient couch. The field of view is the region within the magnetic resonance tomography unit where magnetic resonance signals are captured for imaging. The field of view may be located in the patient tunnel. Next to the field of view may be in the field of view, at an edge of the field of view (e.g., at a wall of the patient tunnel). The transmission coils and reception coils may be arranged in a regular matrix (e.g., in a quadratic pattern like a chess board or a hexagonal grid).

The magnetic resonance tomograph unit may provide an array of reception coils complementing the transmission coils for providing a parallel transmission of a plurality of magnetic resonance signals.

The system according to the present embodiments includes a local coil array and a magnetic resonance tomography, as described before.

The system shares the benefits of the local coil array and the magnetic tomograph unit according to the present embodiments.

In an embodiment of the local coil array, the local coil array includes a combiner matrix with n inputs and m outputs. A combiner matrix according to the present embodiments is any circuit that may provide linear combinations of at least two signals applied at the input to an output. A combiner matrix may provide linear combinations of a plurality of pairs of input signals to the outputs. In one embodiment, the combiner matrix provides a linear combination of a plurality or of all signals at the inputs to an output. A linear combination is any signal combination that may be achieved with a network of linear elements such as resistors, capacities, or inductivities from the input signals. A linear element may also be an active element such as a transistor, FET, or PIN diode in a linear transmission range.

n is a maximum number of antenna coils usable for signal acquisition in parallel. This may be a total number of antenna coils provided in the local coil array. With large coils such as spine coils, the number of antenna coils may exceed the number of receiver channels, and not all antenna coils are in a field of view of the magnetic resonance tomograph unit at the same time. In this case, a switching device in the local coil array may connect a number of n coils to the inputs of the combiner matrix. In this regard, a fixed combination of antenna loops with a single signal output may also count as a single antenna coil.

The MR signals of the antenna coils may be preprocessed before being fed to the n inputs of the combiner matrix. Preferably the signals from the antenna coils are amplified by a low noise amplifier. In one embodiment, a matching/balancing circuit adapts the impedance of the antenna coil to the amplifier. Filters such as bandpass filters may be provided. The frequency conversion to the intermediate frequency may be applied before or after the combiner matrix. Any combination of these features may be provided.

The combiner matrix is configured to apply a predefined phase shift and/or damping to a signal applied to an input. The combiner matrix may also provide predefined linear combinations of signals from the antenna coils. This may be achieved by networks of resistive, capacitive, and/or inductive elements.

m is the number of transmission coils for transmitting the intermediate frequency signals coils. The m outputs of the combiner matrix are in signal connection with the m transmission coils.

This signal connection may be a direct galvanic connection, but the antenna signal may be postprocessed before transmitting. The postprocessing may provide impedance matching to the transmission coils, filtering, amplification, or a combination thereof.

The combiner matrix allows to pre-emphasize the MR signals from the antenna coils for a transmission. The predefined phase shift and/or selection may, for example, be chosen in a way to average energy distribution over the different transmission coils, reduce correlation between the transmitted signals, or improve the signal to noise ratio in the reception path.

In an embodiment of the local coil array, the combiner matrix is configured to combine the n signals from the antenna coils such that, in output signals fed to neighboring transmit coils, in-phase signal components are reduced. The neighboring coils may, for example, be fed with signals that are derived by the combiner matrix from a difference of each of a pair of neighboring antenna coils.

In an embodiment, the combiner matrix is configured such that the signals at the transmission coils are essentially in phase and the array of transmission coil acts essentially as a single large transmit coil.

The dampening of such a large virtual coil is reduced for an inductive transmission over the same distance compared to single antennas out of phase.

In one embodiment, the combiner matrix in the local coil is configured to provide differential signals from antenna coils for transmission, to avoid an artificial high dynamic of the received signals by constructive interference of signals from neighboring antenna coils generated by the signal components in phase in all antenna signals. Such an interference may overload the input amplifiers or the A/D converters on the receiver side.

A reduction of in-phase signal components in adjacent or neighboring transmission coils reduces coupling between the signals transmitted by these coils.

In an embodiment of the local coil array, the local coil array further includes a second frequency converter or a plurality of second frequency converters for converting at least a part of the magnetic resonance signals provided by the antenna coils to a second intermediate frequency. The second intermediate frequency is different than the first intermediate frequency such that the signals transmitted do not overlap in the frequency range. In other words, the first intermediate frequency and the second intermediate frequency differ at least by a value that is larger than the bandwidth of the signals to be transmitted. The second intermediate frequency may be provided using a second local oscillator or may be generated from a single common local oscillator signal.

The second intermediate frequency allows to transmit twice as many signals independently.

In an embodiment of the local coil array, the local coil array provides a plurality of first frequency converters and second frequency converters. The plurality of transmission coils is connected in such a way to the first frequency converters and the second frequency converters that no directly neighboring transmission coils are fed with a signal of the same intermediate frequency.

By the different frequencies, next neighbors of transmission coils are decoupled in the frequency space, and due to the larger distance between transmission coils with the same frequency, the decoupling is also improved in space.

In an embodiment of the local coil array, the transmission coils are double resonant at the first intermediate frequency and at the second intermediate frequency. Double resonance may be achieved, for example, by including the transmission coil electrically as a common part into two resonant circuits with different resonance frequencies.

With transmission of two signals over a single double resonant transmission coil, the number of transmission coils may be reduced.

In an embodiment of the local coil array, the local coil array further includes an auxiliary signal induction coil for receiving an auxiliary signal from the magnetic resonance tomography unit by inductive coupling. The frequency of the auxiliary signal is different from the intermediate frequency and the magnetic resonance signal frequencies. In one embodiment, the auxiliary signal induction coil is resonant at the auxiliary frequency. In one embodiment, the auxiliary coil is double resonant (e.g., on an intermediate frequency and on the auxiliary frequency), such that the auxiliary coil may also be used (e.g., as a transmission coil).

The auxiliary signal induction coil provides means for wirelessly feed additional signals to the local coil array.

In an embodiment of the local coil array, the auxiliary signal induction coil is in signal connection with the first frequency converter for providing a reference frequency signal. The frequency of the auxiliary signal may, for example, be the local oscillator signal for down-mixing the magnetic resonance signal to an intermediate frequency. The local oscillator signal may also be derived from the auxiliary signal (e.g., by frequency multiplication, frequency division, or a PLL).

The auxiliary signal induction coil allows wireless provisioning of a phase- and frequency-stable reference signal for frequency conversion.

In an embodiment of the local coil array, the local coil array includes a power supply unit. The power supply supplies, for example, energy to the low noise amplifiers and/or frequency converters. To cover peaks in the power consumption or to buffer drops in energy transfer during movement, the local coil array may provide chargeable energy storages such as super-capacitors or accumulators and a charging unit, which are charged by the power supply. The power supply is electrically connected to the auxiliary signal induction coil for providing power by currents induced into the auxiliary signal induction coil.

The power supply unit with the auxiliary signal induction coil provides wireless energy supply for the local coil array.

In an embodiment of the local coil array, the antenna coils are double resonant at both the frequency of the magnetic resonance signal and the intermediate frequency. This may be achieved by coupling two resonance circuits both having the antenna coil as a common inductivity. The local coil array is configured to transmit the intermediate frequency signal via the antenna coil as a transmit coil. In other words, the double resonant antenna coil has two terminals, one as input for the transmit signal on the intermediate frequency, one as output for the magnetic resonance signal received by the antenna coil. In one embodiment, the input and output are decoupled (e.g., by different frequency characteristics).

The double resonant antenna coil reduces the weight and increases flexibility of a wireless local coil array.

In an embodiment of the magnetic resonance tomography unit, the magnetic resonance tomography unit includes an auxiliary signal generator and an auxiliary signal transmission coil electrically connected to the auxiliary signal generator for transmitting the auxiliary signal. The auxiliary transmission coil is arranged next to the field of view such that the plurality of reception coil inductively couples with an auxiliary signal induction coil of a local coil array arranged at a patient on the patient couch. The auxiliary transmission coil may, for example, be arranged in the patient couch or at or in a wall of the patient tunnel.

The auxiliary signal generator and the auxiliary signal transmission coil provide a device for wirelessly transmit signals required for operation of the local coil array. The auxiliary signal may, for example, provide a clock signal, local oscillator signal, commands for configuring the local coil, or wireless power transmission.

In an embodiment of the magnetic resonance tomography unit, the magnetic resonance tomography unit further provides a receiver with a plurality of channels for the plurality of reception coils. The receiver provides a signal combiner matrix for combining the plurality of signals from the plurality of reception coils to a second plurality of output signals. The combiner matrix may be, as already described with regard to the combiner matrix in the local coil array, a network of linear elements such as resistors, capacities, or inductivities. The combiner matrix may be configured to provide the same capabilities as described for the local coil array and thereby substituting a combiner matrix in the local coil array. The combiner matrix in the magnetic resonance tomography unit may also be complementary to the combiner matrix in the local coil array, thereby reversing the effects of the combiner matrix applied to the antenna signals for transmission before processing the transmitted signals in the receivers. In one embodiment, the combiner matrix is provided at least partially by digital signal processing in the receiver.

The combiner matrix may preprocess the signal in the receiver to improve the signal for the further processing. The combiner matrix may, for example, reduce the dynamic range by combining signals such that the in phase signal components of different signals interfere destructively instead of adding up to large values that may overdrive an amplifier or an A/D-converter. In general, the combiner matrix may improve the transmission characteristics of the whole signal path.

In an embodiment of the magnetic resonance tomography unit, the combiner matrix in the receiver provides a plurality of adjustable phase shifters and/or adjustable amplifiers, and a controller for adjusting the adjustable phase shifters and/or adjustable amplifiers. A controller of the receiver or the magnetic resonance tomography unit may optimize the adjustment of the combiner matrix to improve a parameter of the signal transmission and/or succeeding signal processing. The parameter may, for example, reduce correlation of signals at the output, thereby separating signals from different regions in the patient. Another parameter may be an improved signal to noise ratio or smaller dynamic range of the signals.

With an optimization of the input signals provided to the digital processing path, the quality of the reconstructed images may further be improved.

In an embodiment of the magnetic resonance tomography unit, the magnetic resonance tomography unit includes a spine coil arranged in or on a patient couch. Antenna coils of the spine coil are resonant at the Larmor frequency of the magnetic resonant tomography and the intermediate frequency, and are configured to receive, by inductive coupling, a signal transmitted by the transmission coils of the local coil array.

In one embodiment, the spine coil may also provide conversion for the magnetic resonance signal received directly from the patient to the first intermediate frequency and/or the second intermediate frequency, such that the wired signal path between spine coil and receiver and the receiver itself are already enabled for receiving and processing the magnetic resonance signal from the local coil, already transposed to the intermediate frequency.

In an embodiment of the system of local coil array and magnetic resonance tomography unit, the phase shift and or damping in the combiner matrix of the local coil array and/or the combiner matrix in the magnetic resonance are adjusted in a way that the transmitted signals of different antenna coils fed to receivers in the magnetic resonance tomograph experience essentially the same phase shift and dampening/amplification. This adjustment may be controlled by the receiver or controller of the magnetic resonance tomography unit. The controller may optimize the parameters of adjustment such as phases shifts and amplification in such a way to minimize a parameter of the signal transmission. In other words, the signals from the antenna coils may be transmitted transparently or sustain essentially the same damping and phase shift. Essentially, this provides that the damping differs less than 12 dB, 6 dB or 3 dB, and the phase shift differs by less than 10 degrees, 5 degrees, or 1 degree.

The mutually adjusted combiner matrix networks provide a transmission with maximum transparency for the signals while reducing adverse effects on the transmission path.

The characteristics, features, and advantages of the invention described above, and also the manner in which these are achieved, will become clearer and easier to understand in conjunction with the description given below of the exemplary embodiments, which are explained in greater detail in conjunction with the drawings.

DETAILED DESCRIPTION

Figure 1:
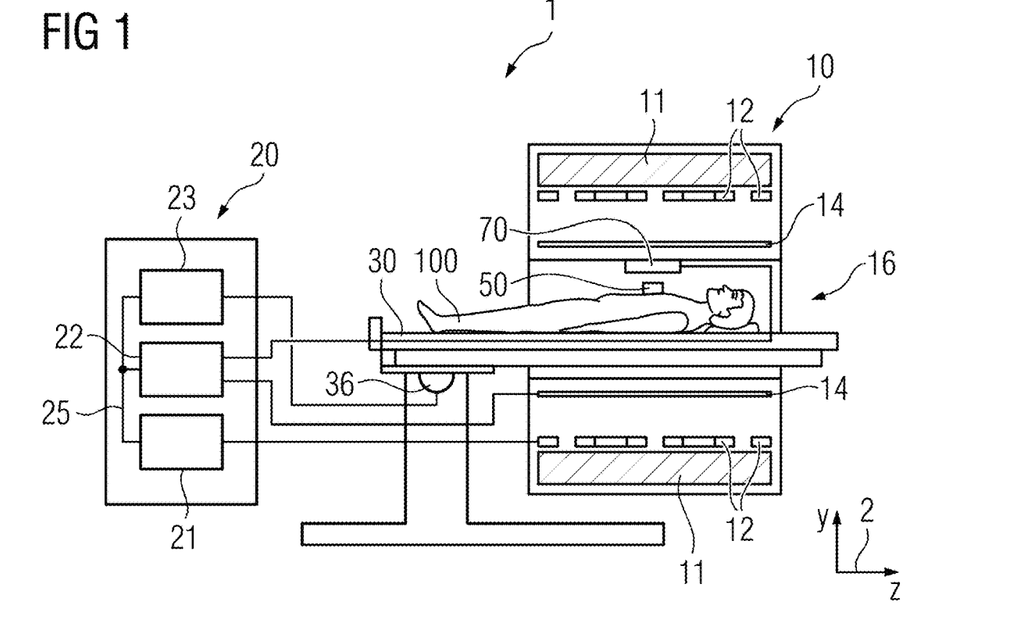
FIG. 1 shows an example of a schematic diagram of a magnetic resonance tomography unit with a local coil array according to the present embodiments.

FIG. 1 shows a schematic diagram of a form of embodiment of a magnetic resonance tomography unit 1 with one embodiment of a local coil array 50.

A magnet unit 10 has a field magnet 11 that generates a static magnetic field B0 for alignment of nuclear spins of samples or patients 100 in a recording region. The recording region is arranged in a patient tunnel 16 that extends in a longitudinal direction 2 through the magnet unit 10. A patient 100 may be moved by a patient couch 30 and a drive unit 36 of the patient couch 30 into the recording region. The field magnet 11 may involve a superconducting magnet that may provide magnetic fields with a magnetic flux density of up to 3 T, with the very latest devices of even more. For lower field strengths, however, permanent magnets or electromagnets with normally conducting coils may be employed.

The magnet unit 10 also has gradient coils 12 that are configured, for spatial differentiation of the recorded imaging regions in the examination volume, to superimpose variable magnetic fields in three spatial directions on the magnetic field B0. The gradient coils 12 may be coils made of normally conducting wires that may generate fields orthogonal to each other in the examination volume.

The magnet unit 10 likewise has a body coil 14 that is configured to radiate a radio-frequency signal supplied via a signal line into the examination volume and to receive resonant signals emitted by the patient 100 and output the resonant signals via a signal line 33. In one embodiment, however, the body coil 14 is replaced, for sending out the radio-frequency signals and/or receiving the radio-frequency signals, by the local coil 50, which is arranged in the patient tunnel 16 close to the patient 100. In one embodiment, however, the local coil 50 may be configured for sending and receiving, and therefore, a body coil 14 may be omitted.

A control unit 20 supplies the magnet unit 10 with the various signals for the gradient coils 12 and the body coil 14 and evaluates the received signals. A magnetic resonance tomography unit controller 23 coordinates the subunits in this case.

Thus, the control unit 20 has a gradient control 21 that is configured to supply the gradient coils 12 via supply leads with variable currents that provide the desired gradient fields coordinated in time in the examination volume.

The control unit 20 also has a radio-frequency unit 22 that is configured to generate a radio-frequency pulse with a predetermined timing curve, amplitude, and spectral power distribution to excite a magnetic resonance of the nuclear spins in the patient 100. In this case, pulse powers in the range of kilowatts may be achieved. The individual units are linked to one another via a signal bus 25.

The radio-frequency signal generated by the radio-frequency unit 22 is conveyed via a signal connection to the body coil 14 and emitted into the body of the patient 100, in order to excite the nuclear spins there. In one embodiment, however, an emission of the radio-frequency signal via one or more coil windings of the local coil 50 may be provided.

The local coil 50 may receive a magnetic resonance signal from the body of the patient 100 since, because of the short distance, the signal-to-noise ratio (SNR) of the local coils 50 is better than a receipt by the body coil 14. The MR signal received by the local coil 50 is preprocessed in the local coil 50 and forwarded to the radio-frequency unit 22 of the magnetic resonance tomography unit 1 for evaluation and image acquisition.

The signal connection between the local coil 50 and the magnetic resonance tomography unit 1 in this case is wireless, at least between the local coil 50 and the antenna unit 70. The special features of this wireless connection will be discussed in greater detail in the description of the subsequent figures. The arrangement of the local coil 50 on the patient 100 and of the antenna unit 70 in the patient tunnel 16 is only chosen by way of example and for reasons of clarity of the drawing. In an embodiment shown below in FIG. 4, for example, the local coil 50 is provided below the patient 100 and the antenna unit 70 in the patient couch 30. In one embodiment, the antenna unit 70 may be arranged in or under cladding of the patient tunnel 16.

Figure 2:
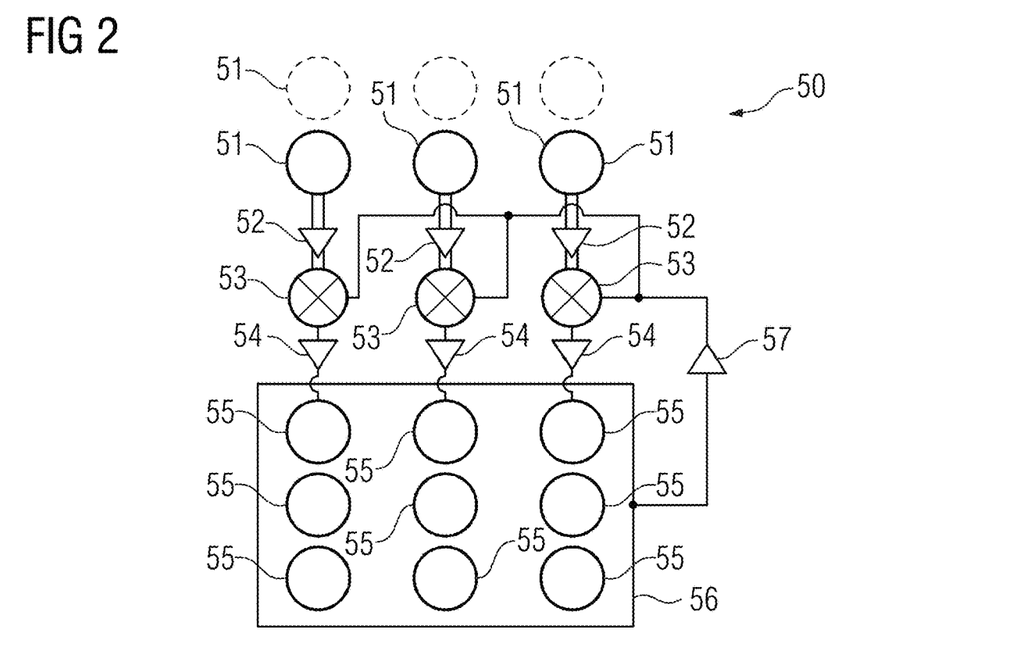
FIG. 2 shows an example of a schematic diagram of one embodiment of a local coil array.

Shown in FIG. 2 is an example of a schematic diagram of a local coil array 50 according to the present embodiments. In this figure, parts are omitted that are not specific for the invention (e.g., components for detuning or the housing of the local coil array).

In the local coil array 50, a plurality of antenna coils 51 for receiving magnetic resonance signals from the patient 100 are provided. The antenna coils 51 are connected to low noise amplifiers 52. A matching and balancing network, not shown in FIG. 2, may adapt impedance and signal to the input of the low noise amplifier 52.

A frequency converter 53 converts the antenna signal to a first intermediate frequency (e.g., to a frequency lower than the Larmor frequency, such as to 8.6 MHz or 11.4 MHz). For mixing the frequency, a local oscillator signal is to be provided. For providing a stable local oscillator signal, this local oscillator signal may be generated centrally in the magnetic resonance tomography unit 1 and transmitted from an auxiliary signal transmission coil 76 to an auxiliary signal induction coil 56 of the local coil array 50. The auxiliary signal induction coil 56 may be larger than the transmission coils 55, as only a single signal is to be transmitted, and the coupling is improved by the larger size. The local oscillator signal is amplified by the LO amplifier 57 and fed to the frequency converters 53.

After frequency conversion, the signal is amplified by the transmission amplifiers 54 and fed for transmission to the transmission coils 55. Due to the frequency conversion, no feedback loop that would limit the amplification is possible. The amplification may be large enough to compensate the losses on the transmission between local coil array 50 and the reception coils 75. The amplification is limited by the power available in the local coil array 50 and the dynamic nature of the magnetic resonance signals from the antenna coils 51.

The plurality of transmission coils 55 are arranged in an array (e.g., in a checkerboard pattern). In one embodiment, the number of transmission antennas 55 is equal to the number of antenna coils 51 to enable independent transmission of antenna signals. Other options are discussed with the following figures.

In FIG. 2, not all the antenna coils 55 are shown for better overview.

The antenna coils 51 and transmission coils 55 may be arranged coplanar in a plane to make the local coil array flat, or even may be arranged concentric such that an antenna coil is concentric with an emission coil 55.

In one embodiment, two different intermediate frequencies, a first intermediate frequency and a second intermediate frequency, are used for transmission. For this purpose, a second local oscillator frequency is required. This frequency may be derived from the local oscillator signal received via the auxiliary signal induction coil (e.g., by frequency multiplication or a PLL circuit). In one embodiment, the auxiliary signal induction coil is configured double resonant, such that two different local oscillator signals may be transmitted to the local coil array. Double resonance of the auxiliary signal induction coil may be achieved, for example, by making the auxiliary signal induction coil a common part in two resonance circuits with two different resonance frequencies.

Figure 3:
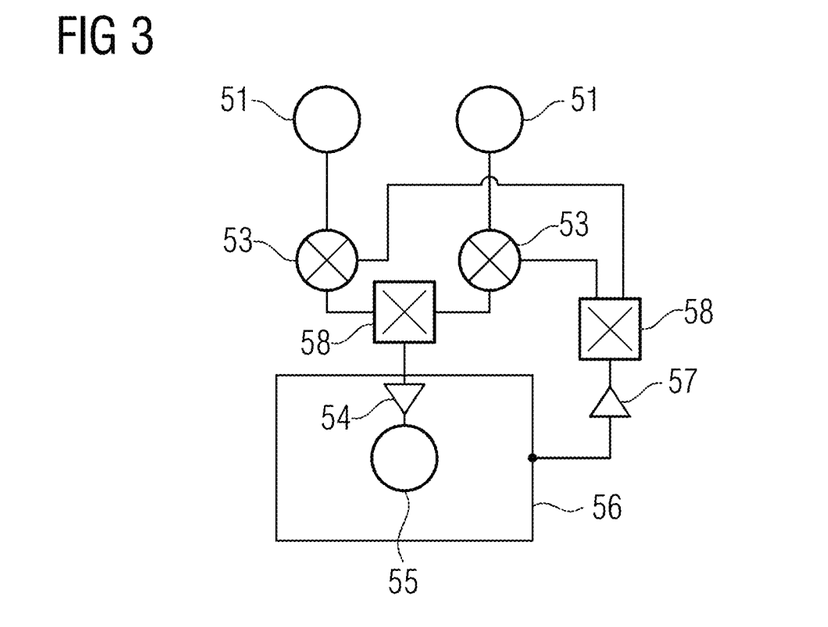
FIG. 3 shows an example of a circuit for two antenna coils and a single transmission coil.

The two frequencies may be used in two different ways. In one embodiment, the transmission coils 55 are configured to be double resonant at both the first intermediate frequency and the second intermediate frequency. In FIG. 3, an example of a circuit for two antenna coils 51 and a single transmission coil 55 is shown. This circuit may be applied for a plurality of transmission coils 55 and twice as many antenna coils 51, combining the two intermediate frequency signals with two different frequencies independently over a common transmission coil 55 for transmission to the magnetic resonance tomography unit 1.

In the embodiment of FIG. 3, two different local oscillator signals are received by the auxiliary signal induction coil 56 and amplified by the LO amplifier 57. The two local oscillator signals are separated by a diplexer 58 and fed to two frequency converters 53 for down converting the two signals from the two antenna coils 51 into a signal at the first intermediate frequency and at the second intermediate frequency. Both intermediate frequency signals are mixed by a diplexer 58, amplified by the transmission amplifier 54, and fed to the double resonant coil 55 for transmission.

The usage of double resonant transmission coils 55 and two different intermediate frequencies allows essentially independently twice as many antenna signals to be transmitted over a same number of transmission coils 55.

In another embodiment, the two separate intermediate frequencies IF1 and IF2 are used to improve the spatial separation of the signals. Instead of mixing and feeding the first intermediate frequency IF1 and second intermediate frequency IF2 to a single transmission coil 55, the signals are amplified separately and fed independently to two different transmission coils, such that a distance between two transmission coils 55 with a same intermediate frequency is increased.

Figure 4:
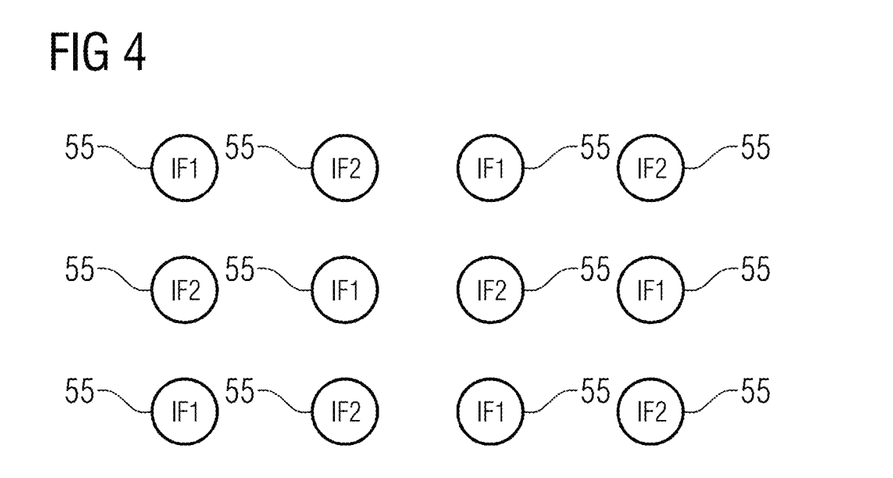
FIG. 4 shows a possible pattern for an arrangement of transmission coils.

FIG. 4 shows a possible pattern for an arrangement of transmission coils. The transmission coils are marked with IF1 and IF2 accordingly. The transmission coils are arranged basically in the pattern of a checkerboard, the white fields assigned to transmission antennas with IF1 and the black fields assigned to transmission antennas with IF2.

By spatially separating transmission antennas 55 with the same intermediate frequency, a cross-coupling of the channels transmitted may be reduced.

In an embodiment of the local coil array, energy is supplied wirelessly using the auxiliary signal.

Figure 5:
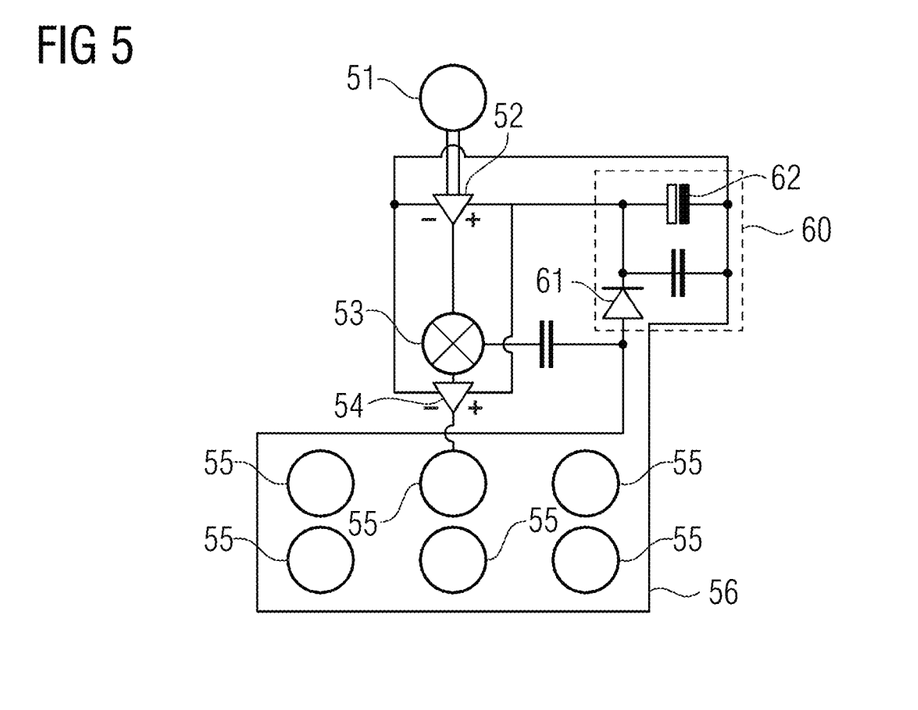
FIG. 5 shows a possible embodiment of a wireless energy supply schematically.

In FIG. 5, a possible embodiment of a wireless energy supply is shown schematically. Not all components of the local coil array are shown in this figure.

In FIG. 5, the auxiliary signal and the auxiliary signal induction coil 56 are used for energy supply. Voltage and current induced by an auxiliary signal transmission coil of the magnetic resonance tomography unit is fed to the power supply unit 60.

The auxiliary signal may also provide the local oscillator signal. The LO signal is fed in parallel to the frequency converters. The LO signal may be filtered for this purpose (e.g., by a bandpass). It is also possible that the frequency is converted by frequency multiplication or a PLL circuit, while maintaining frequency and phase stability. For energy supply, lower frequencies (e.g., below 10 MHz) are more effective (e.g., in rectification), while the LO signals may be, for example, 55 MHz and 75 MHz.

In the power supply unit 60, the auxiliary signal is rectified by rectifier 61 and filtered or buffered by a low pass (e.g., a capacitor). In one embodiment, a part of the energy is stored in an energy storage 62 to buffer changing energy consumption and transmission conditions (e.g., if the patient 100 moves). Such energy storages 62 may, for example, be super capacitors or chargeable batteries. In one embodiment, the energy storage is dimensioned to provide energy to the local coil array 50 for at least 5, 10, or 30 seconds.

Figure 6:
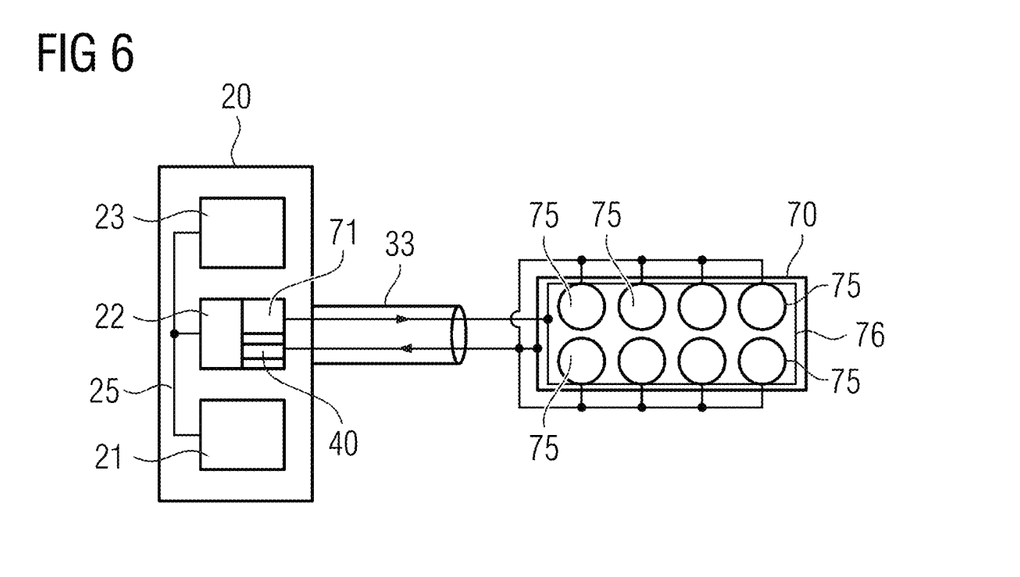
FIG. 6 shows details of an embodiment of a magnetic resonance tomography unit according to the present embodiments in a schematic diagram.

In FIG. 6, details of an embodiment of a magnetic resonance tomography unit 1 are shown in a schematic diagram.

In the radio-frequency unit 22 of the control unit 20 of the magnetic resonance tomography unit 1, an auxiliary signal generator 71 is provided. The auxiliary signal generator generates an auxiliary signal of predetermined frequency and amplitude. In case that the auxiliary signal is used as a LO signal for frequency conversion in the local coil array, the auxiliary is derived from an internal clock of the magnetic resonance tomography unit 1. In case that the auxiliary signal is used for wireless energy supply, the auxiliary signal generator 71 provides a power amplifier for providing enough energy to the signal.

The signal is fed via the signal line 33 to the antenna unit 70. The antenna unit 70 may be arranged in the patient tunnel 16 or as described with regard to another figure in a patient couch 30. In the antenna unit 70, an auxiliary signal transmission coil 76 is provided for transmitting the auxiliary signal to the auxiliary signal induction coil 56 of the local coil array 50 via inductive coupling.

The antenna unit 70 also provides a plurality of reception coils 75 for receiving magnetic resonance signals transmitted by the transmission coils 55 from the local coil array 50. The received signals may be preprocessed in the antenna unit (e.g., amplified or filtered). The magnetic resonance signals are then forwarded to the receivers 40 of the radio-frequency unit 22 via the signal line 33 for further processing.

The signals may be processed in the receivers 40 in the same way as intermediate signals fed via a wired connection from the local coil. For a transparent transmission of the signals from each antenna coil 51, the image reconstruction may also be provided in a standard way. In one embodiment, for transmission optimization, antenna signals from different coils may be mixed, as explained with the following figures, where the reconstruction may be adapted.

Figure 7:
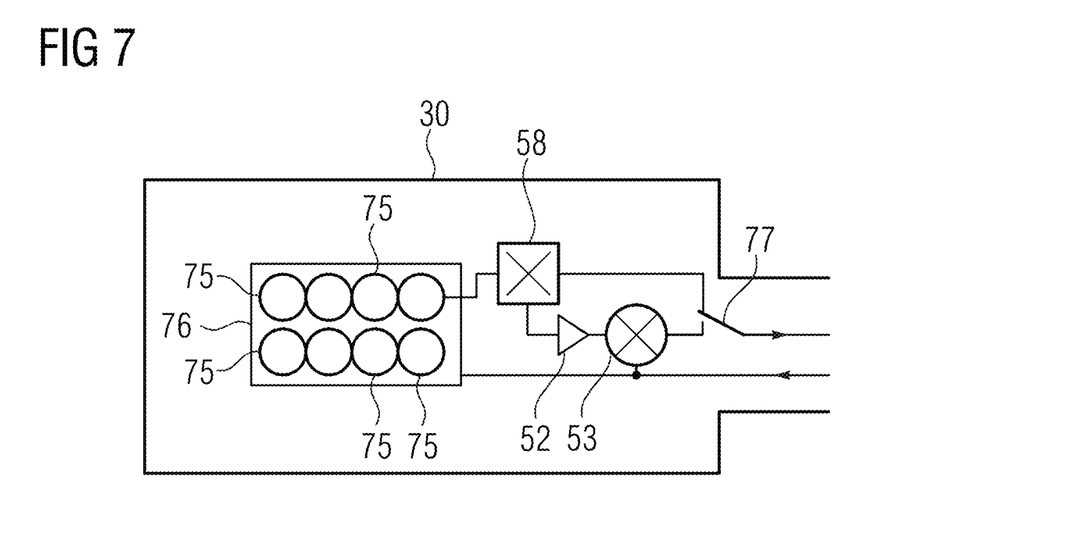
FIG. 7 shows an embodiment of the antenna unit that is integrated as a spine coil into a patient couch.

In FIG. 7, an embodiment of the antenna unit 70 is shown, which is integrated as a spine coil into a patient couch 30.

The spine coil provides a plurality of reception coils 75 that are double resonant for the Larmor frequency of the magnetic resonance tomography unit 1 and the first intermediate frequency and/or the second intermediate frequency. The spine coil of FIG. 7 provides for each reception coil a signal path that may be switched with the mode selector 77 between two reception modes. For better overview, only the signal path for a single coil 75 is shown.

In the first mode, the spine coil acts as a spine coil per se (e.g., the spine coil receives magnetic resonance signals at the Larmor frequency directly from a spine region of a patient 100 on the patient couch 30). A diplexer 58 separates signals at the Larmor frequency and at the intermediate frequency. The magnetic resonance signals at Larmor frequency are amplified by the low noise amplifier 52, transposed to the intermediate frequency by the frequency converter 53, and connected by the mode selector 77 to the signal line 33 for further processing.

In the second mode, the received signal from the local coil array 50 at the first intermediate frequency and/or the second intermediate frequency is directly, or after optional filtering and amplification, forwarded through the mode selector 77 to the signal line 33.

In both modes, a plurality of magnetic resonance signals at an intermediate frequency are fed to the receivers for further processing to the receivers 40.

Figure 8:
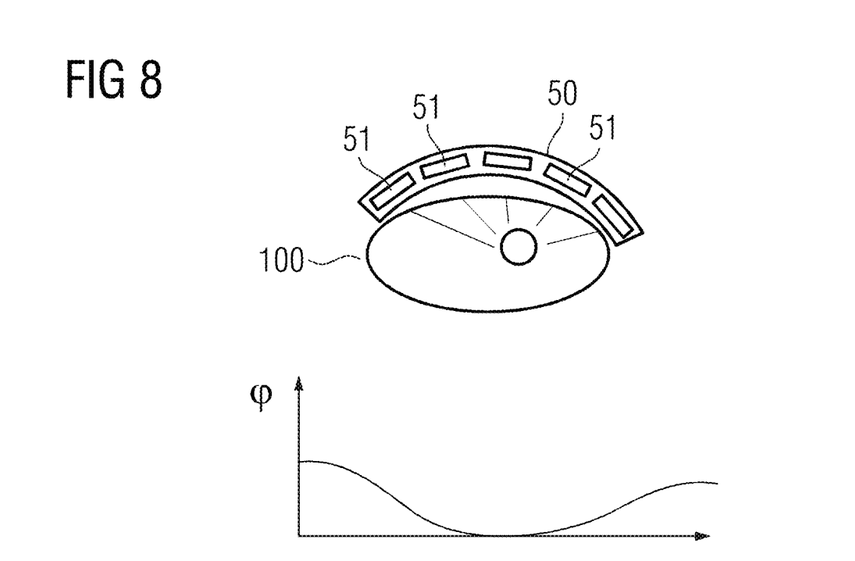
FIG. 8 shows the cause of different signal delays between source and receivers.

If signals of adjacent transmission coils are out of phase, these signals may interfere at the reception coils 75 destructively. In FIG. 8, the different path length between an organ to be imaged and the antenna coils 51 is shown, which results in a phase shift shown in the diagram below, minimum for the antenna coils 51 in the middle of the local coil array 50.

To compensate this effect, a combiner matrix 65 is integrated into the signal path of the local coil array 50. A possible embodiment is shown in the schematic diagram of FIG. 9. After amplification, the signal of each antenna coil 51 is delayed in the combiner matrix 65 by a phase shifter 66 by a predefined value, which is given by the geometry in the typical use case of the local coil array. The delay is chosen in a way to compensate the geometric effects such that the signals after the combiner matrix 65 have the same delay or phase shift in regard to the signal source in the patient 100.

Figure 9:
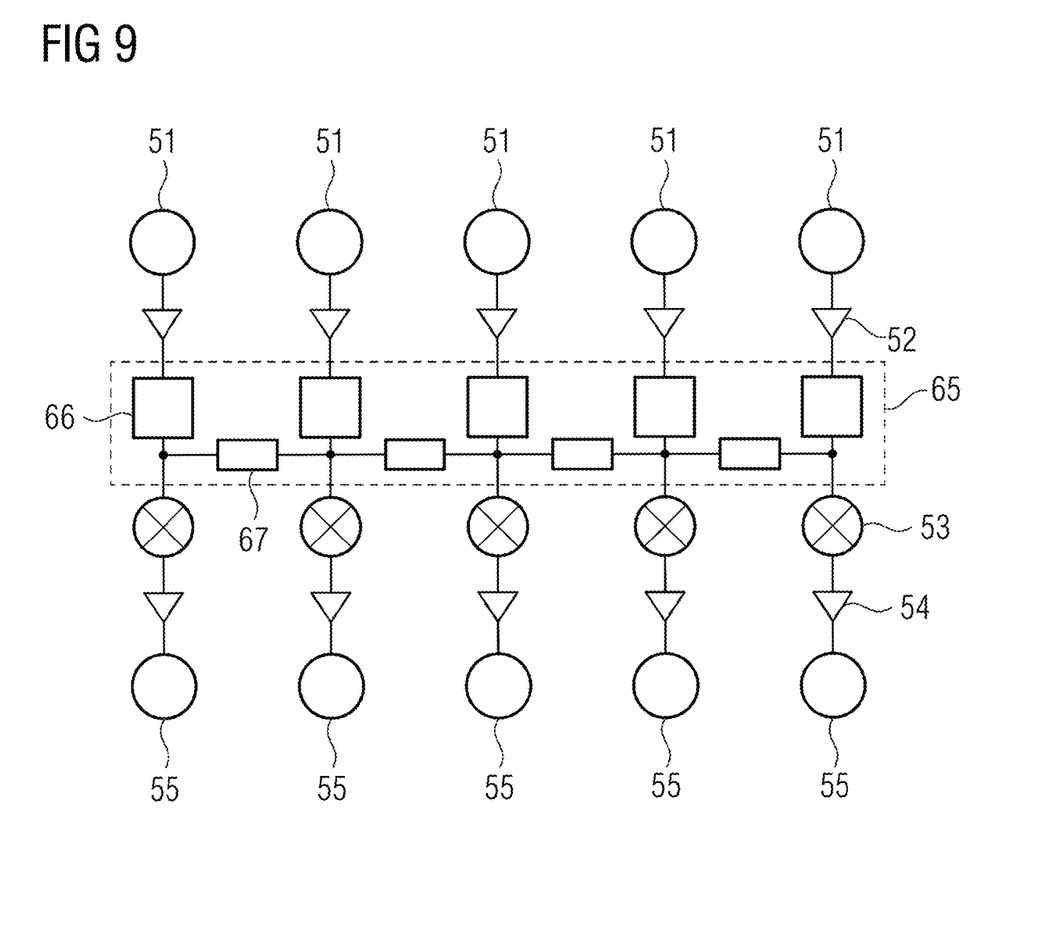
FIG. 9 shows an embodiment of the local coil array according to the present embodiments with a combiner matrix network.

An adverse effect may be that by the constructive interference of the strong in phase signals, an input of the receivers may be overloaded (e.g., the linear range of amplifiers or the dynamic range of an A/D-converter). In one embodiment, the combiner matrix 65 also provides cross coupler 67 for a combination of signals of different antenna coils 51. To reduce the in-phase component, the cross couplers 67 may, for example, invert the signal and dampen the signal by a predefined value before the signals are summed up.

A combiner matrix 65 may be arranged at different places in the signal path. The combiner matrix 65 may be arranged between the low noise amplifier 52 and the frequency converter 53, or between the frequency converter 53 and the transmission amplifier 54. Due to the different frequency, the values of the phase shifter 66 may have to be adjusted.

In one embodiment, the combiner matrix 65 is located between the reception coils 75 and the receivers 40. The combiner matrix 65 in the magnetic resonance tomography unit 1 may compensate the phase shifts in a similar way as described with FIG. 8 and FIG. 9. It is also possible that the first combiner matrix in the local coils array 50 pre-emphasizes the signals for the transmission, while the second combiner matrix in the magnetic resonance tomography unit 1 reverses the effect after transmission, such that the signals from the antennas 51 are essentially transmitted transparently to the receivers except a common amplification/damping or phase shift.

In one embodiment, the combiner matrix 65 on the reception side is adjustable by switchable or adjustable components, such that the magnetic resonance tomography unit controller 23 may adjust the combiner matrix to compensate effects, for example, of a moving patient 100 or a different relative localization of the local coil array 50 in relation to the antenna unit 70.

Although the invention has been illustrated and described in greater detail by the exemplary embodiments, the invention is not restricted by the enclosed examples, and other variations may be derived herefrom by the person skilled in the art, without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A local coil array for a magnetic resonance tomography unit, the local coil array comprising:
   a plurality of antenna coils configured to receive magnetic resonance signals from a patient;
   a first frequency converter configured to convert the magnetic resonance signals to a first intermediate frequency;
   a plurality of transmission coils configured to transmit the converted magnetic resonance signals by inductive coupling; and
   a second frequency converter configured to convert the magnetic resonance signals to a second intermediate frequency.

2. The local coil array of claim 1, further comprising a combiner matrix with n inputs and m outputs,
   wherein n is a maximum number of antenna coils usable for signal acquisition in parallel, and m is a number of transmission coils,
   wherein the n antenna coils are in signal connection with the n inputs, and the m transmission coils are in signal connection with the m outputs, and
   wherein the combiner matrix is configured to apply a predefined phase shift, damping, or phase shift and damping to a signal applied to an input.

3. The local coil array of claim 2, wherein the combiner matrix is configured to combine the n signals from the antenna coils, such that in output signals fed to neighboring transmit coils, an in-phase signal component is reduced.

4. The local coil array of claim 1, further comprising a plurality of first frequency converters and second frequency converters, the plurality of first frequency converters and second frequency converters comprising the first frequency converter and the second frequency converter, and
   wherein the plurality of transmission coils are connected to the plurality of first frequency converters and second frequency converters, such that no directly neighboring transmission coils are fed with a signal of a same intermediate frequency.

5. The local coil array of claim 1, wherein the plurality of transmission coils are double resonant at the first intermediate frequency and at the second intermediate frequency.

6. The local coil array of claim 1, further comprising an auxiliary signal induction coil configured to receive an auxiliary signal from the magnetic resonance tomography unit by inductive coupling.

7. The local coil array of claim 6, wherein the auxiliary signal induction coil is in signal connection with the first frequency converter for providing a reference frequency signal.

8. The local coil array of claim 6, further comprising a power supply unit,
   wherein the power supply unit is electrically connected with the auxiliary signal induction coil for power reception.

9. The local coil array of claim 1, wherein the plurality of antenna coils are double resonant at both a frequency of the magnetic resonance signals and the intermediate frequency, and
   wherein the local coil array is configured to transmit the converted magnetic resonance signals via the plurality of antenna coils as transmit coils.

10. A magnetic resonance tomography unit comprising:
    a field of view; and
    a plurality of reception coils configured to inductively couple to transmission coils of a local coil array;
    a receiver comprising a plurality of channels for the plurality of reception coils,
    wherein the receiver comprises a signal combiner matrix configured to combine the plurality of signals from the plurality of reception coils to another plurality of output signals, such that a correlation of the output signals is reduced in comparison to the input signals, and
    wherein the plurality of reception coils is arranged next to the field of view such that the plurality of reception coils inductively couples with the transmission coils of the local coil array, which is arranged at a patient in the field of view.

11. The magnetic resonance tomography unit of claim 10, further comprising:
    an auxiliary signal generator; and
    an auxiliary signal transmission coil connected to the auxiliary signal generator,
    wherein the auxiliary signal transmission coil is arranged next to the field of view, such that the plurality of reception coils inductively couples with an auxiliary signal induction coil of the local coil array arranged at the patient on a patient couch.

12. The magnetic resonance tomography unit of claim 10, wherein the signal combiner matrix is configured to provide a plurality of adjustable phase shifters, adjustable amplifiers, or adjustable phase shifters and adjustable amplifiers, and a controller configured to adjust the adjustable phase shifters, the adjustable amplifiers, or the adjustable phase shifters and the adjustable amplifiers.

13. The magnetic resonance tomography unit of claim 10, further comprising a spine coil arranged on or in the patient couch,
    wherein the reception coils are double resonant antenna coils of the spine coil.

14. A system comprising:
a local coil array comprising:
- a plurality of antenna coils configured to receive magnetic resonance signals from a patient;
- a first frequency converter configured to convert the magnetic resonance signals to a first intermediate frequency;
- a plurality of transmission coils configured to transmit the converted magnetic resonance signals by inductive coupling; and
- a combiner matrix with n inputs and m outputs; and a magnetic resonance tomography unit comprising:
- a field of view;
- a plurality of reception coils configured to inductively couple to transmission coils of a local coil array, wherein the plurality of reception coils is arranged next to the field of view such that the plurality of reception coils inductively couples with the transmission coils of the local coil array, which is arranged at a patient in the field of view; and
- a receiver comprising a plurality of channels for the plurality of reception coils, wherein n is a maximum number of antenna coils usable for signal acquisition in parallel, and m is a number of transmission coils, wherein the n antenna coils are in signal connection with the n inputs, and the m transmission coils are in signal connection with the m outputs, wherein the combiner matrix is configured to apply a predefined phase shift, damping, or phase shift and damping to a signal applied to an input, wherein the receiver comprises a signal combiner matrix configured to combine the plurality of signals from the plurality of reception coils to another plurality of output signals, such that a correlation of the output signals is reduced in comparison to the input signals, and wherein the phase shift, the damping, or the phase shift and the damping in the combiner matrix of the local coil array, the signal combiner matrix in the magnetic resonance tomography unit, or the combiner matrix of the local coil array and the signal combiner matrix in the magnetic resonance tomography unit are adjusted in a way that the transmitted signals of different antenna coils fed to receivers in the magnetic resonance tomography unit experience a same phase shift and dampening/amplification.

15. A local coil array for a magnetic resonance tomography unit, the local coil array comprising:
- a plurality of antenna coils configured to receive magnetic resonance signals from a patient;
- a first frequency converter configured to convert the magnetic resonance signals to a first intermediate frequency;
- a plurality of transmission coils configured to transmit the converted magnetic resonance signals by inductive coupling; and
- a combiner matrix with n inputs and m outputs, wherein n is a maximum number of antenna coils usable for signal acquisition in parallel, and m is a number of transmission coils, wherein the n antenna coils are in signal connection with the n inputs, and the m transmission coils are in signal connection with the m outputs, and wherein the combiner matrix is configured to apply a predefined phase shift, damping, or phase shift and damping to a signal applied to an input.

16. A local coil array for a magnetic resonance tomography unit, the local coil array comprising:
- a plurality of antenna coils configured to receive magnetic resonance signals from a patient;
- a first frequency converter configured to convert the magnetic resonance signals to a first intermediate frequency;
- a plurality of transmission coils configured to transmit the converted magnetic resonance signals by inductive coupling; and
- an auxiliary signal induction coil configured to receive an auxiliary signal from the magnetic resonance tomography unit by inductive coupling, wherein the auxiliary signal induction coil is in signal connection with the first frequency converter for providing a reference frequency signal.

* * * * *